March 15, 1932. G. H. ZOUCK 1,849,131
FLEXIBLE CONNECTION
Filed Oct. 10, 1928  2 Sheets-Sheet 1

INVENTOR
George H. Zouck
BY Synnestvedt & Lechner
ATTORNEYS

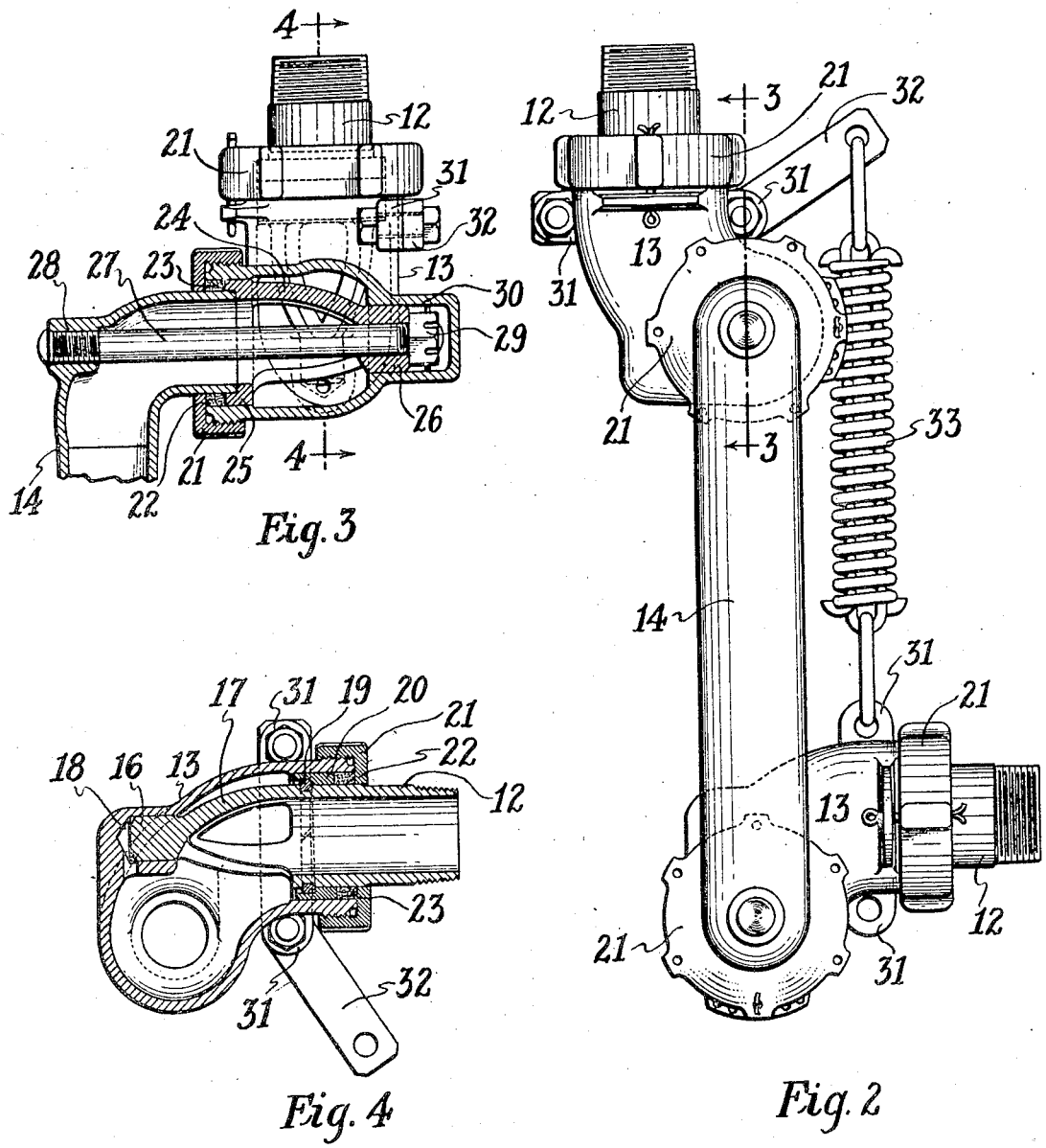

Patented Mar. 15, 1932

1,849,131

UNITED STATES PATENT OFFICE

GEORGE H. ZOUCK, OF ORANGE, NEW JERSEY, ASSIGNOR TO FRANKLIN RAILWAY SUPPLY COMPANY, OF NEW YORK, N. Y., A CORPORATION OF DELAWARE

FLEXIBLE CONNECTION

Application filed October 10, 1928. Serial No. 311,614.

This invention relates to flexible connections and more particularly to flexible pipe connections for use between coupled railway vehicles.

Generally considered, it is the object of this invention to provide a flexible pipe connection of the character above noted which is rugged in construction, easy to assemble and repack or repair, and which, at the same time, affords a maximum of flexibility.

A specific object of the invention is the provision of a flexible connection which may be taken down for purposes of repair of repacking without disconnecting any threaded pipe connections.

I also provide an improved flexible supporting mechanism for the movable parts of the connection as will appear more fully hereinafter.

How the foregoing, together with other objects and advantages are obtained, will be best understood from a consideration of the following description taken with the accompanying drawings which illustrate the preferred embodiment of the invention, and in which Fig. 1 is a side view of the connection of the present invention as applied to the ends of two coupled railway vehicles, the buffer parts and the coupler of the vehicles being shown somewhat diagrammatically.

Fig. 2 is a side elevational view of the portion of the connection associated with the flexible joints.

Fig. 3 is a view taken substantially on the line 3—3 of Fig. 2, and

Fig. 4 is a sectional view taken as indicated by the line 4—4 of Fig. 3.

Figure 1:
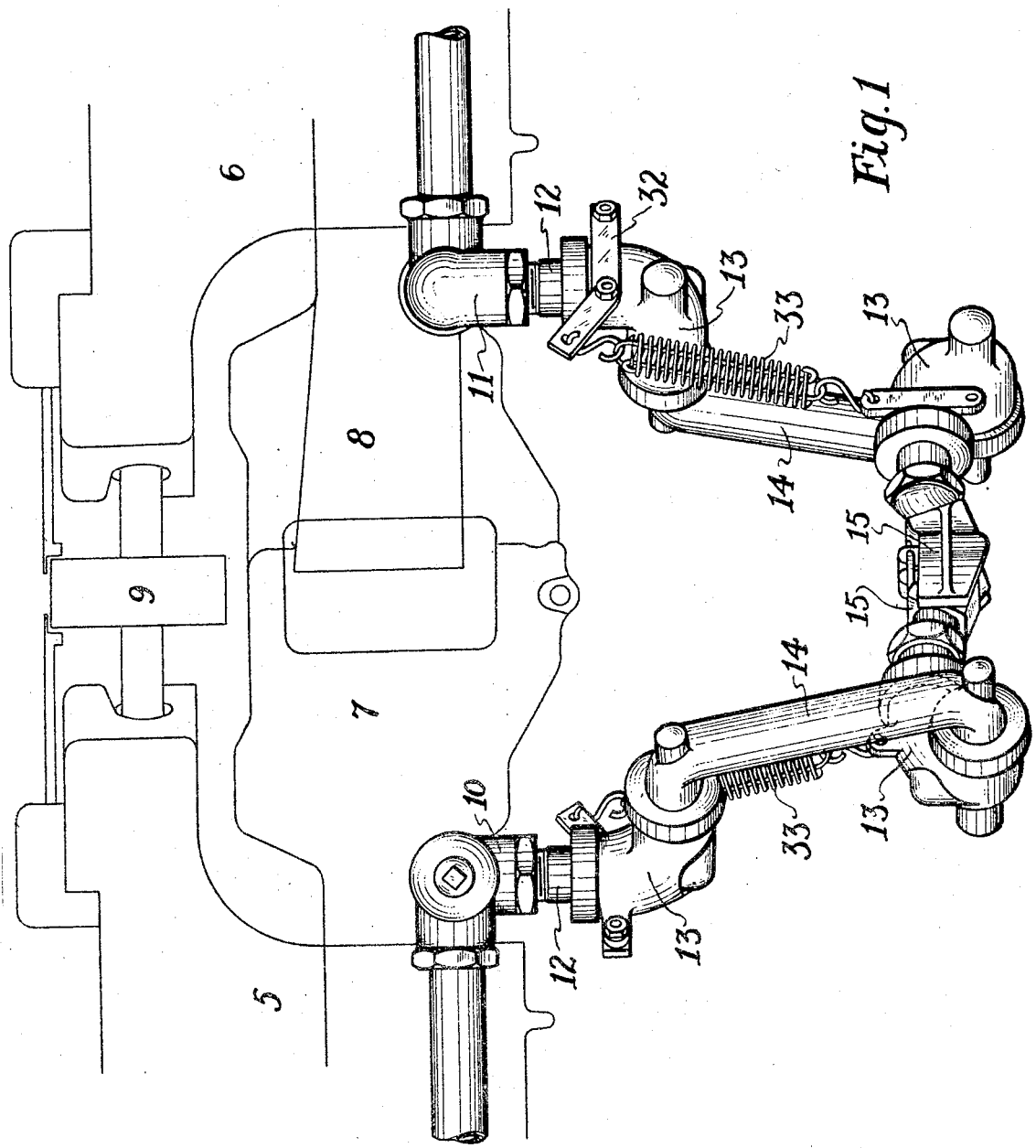

Referring now particularly to Fig. 1, the coupled vehicles are indicated at 5 and 6, the same being provided with couplers 7 and 8, respectively, and a buffer mechanism indicated at 9 therebetween. Fragments of the pipes to be connected are indicated at 10 and 11.

The parts associated with the pipes 10 and 11 are identical in each instance, and comprise, in general, the sleeve member 12, flexible joint housing members 13, a connection 14 between the housings and a coupler 15 of a well known construction for connecting or disconnecting the parts associated with each of the coupled vehicles.

As will be seen from inspection of Figs. 2, 3 and 4, the sleeve-like member 12 which is threaded into the pipe 10 (or the pipe 11) terminates in a cylindrical bearing 16 of substantially smaller diameter than that of the sleeve itself, the same being joined thereto preferably by means of the three converging webs 17. The sleeve or inner joint member 12 is mounted for rotary movement in the housing or outer joint member 13, and it should be noted that the construction provides two axially spaced bearings, one of which is provided for by a recess or cup 18 formed integral with the housing 13 and fitting the bearing 16. The construction provided for the other bearing includes a split locking ring 19 fitting an annular groove formed in the body of the sleeve member 12 and an internally shouldered collar member 20 adapted to engage the ring 19. An internally flanged nut member 21 is arranged around the sleeve 12 and threaded onto the body member 13. Note that the parts are arranged to provide a packing groove or recess between the flange 22 and the edge of the collar 20. Thus when the packing ring 23 is inserted and the nut member 21 tightened in position, the flange 22 engages the packing ring 23 and through the same reacts against the ring 20 to secure the parts in operative position.

At the ends of each of the couplings or connections 14 is arranged a sleeve member 24 (see Fig. 3) having a web-like construction similar to that of the sleeves 12 and including a shouldered ring 25 at one end adapted to engage the end of the member 14. At its other end each of the web-like constructions terminates in a centrally hollowed bearing ring 26 through which the stud or bolt member 27 is adapted to extend in order to secure the sleeve to the coupling 14, the said bolt member taking into a boss 28 near the end of the coupling, which, as indicated in Fig. 3, is elbowed at its ends. A nut 29 serves to secure the parts in assembled position. The housing 13 is provided with a recess or chamber 30 adapted to fit and receive the bearing 26 at the apex of the web construction 24. At the other end of the member 24 a bearing is provided in the housing 13 which is adapted to engage the shouldered ring 25, and it should be noted that a nut member 21 having a flange 22 is also associated with the coupling 14 and the housing 13 in order to secure the former in its operative position. The packing ring 23, in this instance, is adapted to be received in an annular cavity formed between the ring 25 and the internal flange 22 of the nut member 21.

The construction and application of the sleeve members 24 at each end of the couplings 14 are identical, and it should be noted that the sleeves 24 extend at right angles to the body of the couplings 14 on parallel axes. Further, it should be observed that the upper and lower flexible joints, including their housings 13 and the sleeve members 12 and 24 associated therewith, are all identical in construction, but mounted in different positions. The sleeve member 12 associated with the lower housing 13 is adapted to be threaded into the coupling device 15 which, being of a well known construction, is not described in detail herein.

The resilient supporting mechanism for the lower parts of the flexible connection includes lugs 31 preferably cast integral with the housings 13. A spring support 32 suitably bolted to the lugs 31 of the upper housing 13 is configured and arranged to provide, together with one of the lugs 31 of the lower housing 13, a hanging for the spring 33 which is parallel to the coupling 14 when the parts are substantially in their normal coupled position. Note also that if a line be drawn between the upper hanging point of the spring and a point in the axis of the upper sleeve 24 the same will be parallel to a line drawn between a point in the axis of the lower sleeve 24 and the lower spring hanging point. Therefore, the lines drawn as just indicated considered with the spring 33 and the coupling 14 define a parallelogram. Thus when the coupled vehicles 5 and 6 move longitudinally with respect to each other, as, for example, when slack is taken up, the parallelogram formed is maintained, and the supporting force of the spring 33 will remain constant. Indeed, under all normal flexure of the connection, this condition is maintained with the result that undue strains to the rotatably mounted parts of the joints are eliminated.

In connection with the mounting of the sleeves 12 in their respective housings 13, it should be observed that provision is made for repacking or replacing parts without the usual troublesome feature of disconnecting the threaded pipe connections with which the sleeves 12 are associated. This is accomplished (see Fig. 4) by removal of a nut member 21 from engagement with a housing 13 and thus permitting withdrawal of the housing. The packing ring 23 and the collar 20 may now be moved along the shank of the member 12 toward its threaded end. This permits removal of the split ring 19 from the groove in the shank of the sleeve 12 and over the bearing 16 at the converging ends of the webs 17. The collar 20, packing ring 23, and the nut member 22 may now be removed from the sleeve 12 in the same direction.

Repacking of the sleeve 24 is accomplished by loosening the nut member 21 associated therewith and removing the end of the coupling 14 with its sleeve 24 from the housing 13. Access may now be had to the nut 29 in order to separate the sleeve 24 from the coupling 14, after which replacement of the packing ring 23 may be made.

Thus, the flexible connection of the present invention embodies a supporting mechanism which is balanced, so to speak in order to avoid unevenness in spring tension regardless of the flexed position of the parts. The joint is also extremely easy to assemble or repack, particularly in view of the fact that all the parts of the joint may be taken down without disconnecting any threaded pipe connections.

I claim:

1. A flexible pipe connection including two sleeve members having means at one end for connection with the pipes to be flexibly connected, a pair of body members in which the other ends of said sleeve members are rotatably mounted, a connection between the body members including other sleeve members rotatably mounted in said body members and means for securing said parts in operative position, all of said parts and said means being separable without disconnecting the first mentioned sleeve members from the said pipes to be flexibly connected.

2. A flexible pipe connection including two sleeve members having means at one end for connection with the pipes to be flexibly connected, a pair of body members in which the other ends of said sleeve members are rotatably mounted, a connection between the body members including other sleeve members rotatably mounted in said body members and packings between each of said sleeve members and the body in which it is mounted, all of the packings being replaceable without disconnecting the first mentioned sleeve members from the said pipes to be flexibly connected.

3. In apparatus of the character described, a body member and a rotatable connection associated therewith including an elbow, a sleeve mounted in the body member and having a circumferential shoulder adapted to engage one end of the elbow and a stud for securing the elbow and sleeve together.

4. In apparatus of the character described, a body member and a rotatable connection associated therewith including an elbow, a sleeve mounted in the body member and having a circumferential shoulder adapted to engage one end of the elbow, means for securing the elbow and sleeve together including a stud secured to the elbow and to the end of the sleeve remote from its shoulder.

5. A flexible connection including a body member, a second body member, a connection between the body members including a sleeve member at each end thereof mounted for rotation in the body members on parallel axes and a spring supporting means secured to and reacting between the body members.

6. A flexible connection including a body member, a second body member, a connection between the body members including a sleeve member at each end thereof mounted for rotation in the body members on parallel axes and spring supporting means reacting between the body members, together with means secured to said members for hanging the spring means therefrom at points to one side of the axes of rotation of said sleeves.

7. A flexible connection including a body member, a second body member, a connection between the body members including a sleeve member at each end thereof mounted for rotation in the body members on parallel axes and a spring supporting means reacting between the body members, together with means secured to said members for hanging the spring means therefrom at points to one side of the axes of rotation of said sleeves, the said points forming, with a point in each of said axes, a parallelogram.

8. A flexible connection including a joint member, a second joint member, and a connection member between the joint members including means at the ends of the said connection member rotatably associated with the joint members, the said means being arranged to provide parallel axes of rotation, together with a resilient supporting means secured to and reacting between the joint members.

9. A flexible joint including a socket member having spaced bearing means, a connection member one end of which has complementary spaced bearing means mounted in the socket member for relative rotative movement, a locking ring secured to the connection member but separable therefrom over the end mounted in the socket member and means for securing the parts in operative position.

10. A flexible joint including a socket member having spaced bearing means, a connection member one end of which has complementary spaced bearing means mounted in the socket member for relative rotative movement, a locking ring secured to the connection member but separable therefrom over the end mounted in the socket member and means for securing the parts in operative position, said securing means also being separable from the connection member over the end mounted in the socket member.

11. In a flexible joint, a pair of joint parts mounted one within the other for relative movement and means securing the parts together but providing for detachment or separation thereof, said means including a two-ring locking device associated with one joint part one ring of which is split and the other of which is recessed to engage the split ring, and means associated with the other joint part and adapted to react against said device to secure the joint parts together.

12. A flexible connection for use between coupled vehicles including, in combination with vertically spaced conduits to be connected, a section of piping extended between the conduits, a flexible joint device interconnecting the upper end of said piping and the upper conduit, a second flexible joint device interconnecting the lower end of said piping and the lower conduit, each of said joint devices providing for relative rotative movement between the piping section and the said conduits, and a spring supporting mechanism for lower flexible connection parts, said mechanism including means for hanging the spring, at its ends, at points to one side of the joint devices, the said points forming, with a point in each of said devices, a parallelogram.

In testimony whereof I have hereunto signed my name.

GEORGE H. ZOUCK.

DISCLAIMER 1,849,131.—*George H. Zouck*, Orange, N. J. FLEXIBLE CONNECTION. Patent dated March 15, 1932. Disclaimer filed August 21, 1933, by the patentee, and the assignee, *Franklin Railway Supply Company*.

Hereby enter this disclaimer to that part of the claim in said specification which is in the following words, to wit:

"8. A flexible connection including a joint member, a second joint member, and a connection member between the joint members including means at the ends of the said connection member rotatably associated with the joint members, the said means being arranged to provide parallel axes of rotation, together with a resilient supporting means secured to and reacting between the joint members."

[*Official Gazette September 19, 1933.*]

DISCLAIMER 1,849,131.—*George H. Zouck*, Orange, N. J. FLEXIBLE CONNECTION. Patent dated March 15, 1932. Disclaimer filed January 5, 1934, by the patentee, and the assignee, *Franklin Railway Supply Company*.

Hereby enter this disclaimer to that part of the claim in said specification which is in the following words, to wit:

"12. A flexible connection for use between coupled vehicles including, in combination with vertically spaced conduits to be connected, a section of piping extended between the conduits, a flexible joint device interconnecting the upper end of said piping and the upper conduit, a second flexible joint device interconnecting the lower end of said piping and the lower conduit, each of said joint devices providing for relative rotative movement between the piping section and the said conduits, and a spring supporting mechanism for lower flexible connection parts, said mechanism including means for hanging the spring, at its ends, at points to one side of the joint devices, the said points forming, with a point in each of said devices, a parallelogram."

*[Official Gazette January 30, 1934.]*